(12) United States Patent
Hunter

(10) Patent No.: US 9,973,645 B2
(45) Date of Patent: May 15, 2018

(54) MULTI-MODE LASER ENERGY CONTROL FOR THERMOCHROMIC PRINT SYSTEMS

(71) Applicant: Xerox Corporation, Norwalk, CT (US)

(72) Inventor: Timothy M. Hunter, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/270,607

(22) Filed: Sep. 20, 2016

(65) Prior Publication Data

US 2018/0063357 A1   Mar. 1, 2018

Related U.S. Application Data

(60) Provisional application No. 62/382,412, filed on Sep. 1, 2016.

(51) Int. Cl.
| | | |
|---|---|---|
| B41J 2/47 | (2006.01) |
| H04N 1/04 | (2006.01) |
| H04N 1/12 | (2006.01) |
| H04N 1/036 | (2006.01) |
| H04N 1/405 | (2006.01) |

(52) U.S. Cl.
CPC ........... H04N 1/0446 (2013.01); H04N 1/036 (2013.01); H04N 1/12 (2013.01); H04N 1/4056 (2013.01); *H04N 2201/0082* (2013.01)

(58) Field of Classification Search
CPC ............. H04N 1/0446; H04N 1/00278; H04N 1/0036; H04N 1/12; H04N 1/4056; H04N 2202/0082; B41J 2/442; B41J 2/47; B41J 2/475; B41J 2/4753; B41J 2/471
See application file for complete search history.

(56) References Cited

U.S. PATENT DOCUMENTS

| | | | |
|---|---|---|---|
| 8,767,270 B2 | 7/2014 | Curry et al. | |
| 2002/0024586 A1* | 2/2002 | Nakatsuka | B41J 2/471 347/246 |
| 2010/0208329 A1 | 8/2010 | Sandstrom et al. | |
| 2010/0269454 A1 | 10/2010 | Reddersen et al. | |
| 2010/0296127 A1* | 11/2010 | Barndt | B41J 3/50 358/3.24 |
| 2011/0156382 A1* | 6/2011 | Uyttendaele | B41M 3/14 283/91 |
| 2013/0050669 A1 | 2/2013 | Maeda | |
| 2015/0251449 A1* | 9/2015 | Isozaki | B41J 11/002 347/102 |
| 2017/0001459 A1* | 1/2017 | Uehira | B41M 7/0009 |

* cited by examiner

*Primary Examiner* — Geoffrey Mruk
*Assistant Examiner* — Scott A Richmond
(74) *Attorney, Agent, or Firm* — Kevin Soules; Luis M. Ortiz; Kermit D. Lopez

(57) ABSTRACT

A printing system and method comprising a transport system configured to move a print target, a laser for directing energy on the print target, and a control system configured to adjust the energy directed on the print target according to a present speed of the print target the control system further comprising an analog control, a scrolling window control, a pulse width modulation control, and a halftone modulation control.

11 Claims, 15 Drawing Sheets

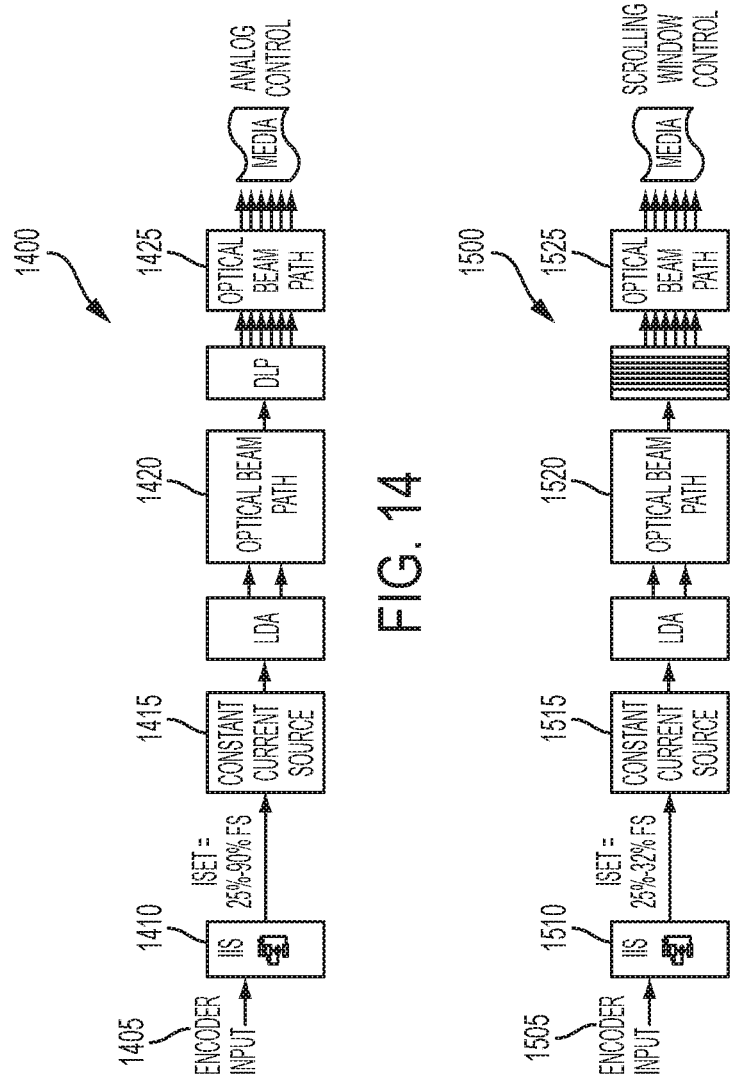

MULTI-MODE LASER ENERGY CONTROL FOR THERMOCHROMIC PRINT SYSTEMS

CROSS REFERENCE TO RELATED PATENT APPLICATIONS

This patent application claims the priority and benefit under 35 U.S.C. § 119(e) of U.S. Provisional Patent Application Ser. No. 62/382,412 filed Sep. 1, 2016, entitled "MULTI-MODE LASER ENERGY CONTROL FOR THERMOCHROMIC PRINT SYSTEMS." U.S. Provisional Patent Application Ser. No. 62/382,412 is herein incorporated by reference in its entirety.

TECHNICAL FIELD

Embodiments are generally related to the field of printing. Embodiments are also related to methods and systems for thermochromic printing. Embodiments are further related to methods and systems for tracking media speed and controlling incident energy accordingly. Embodiments are related to methods and systems for implementing a control architecture that provides transitions between control schemes for thermochromic printing according to media speed.

BACKGROUND

New marking technologies based on thermochromic inks are becoming increasingly popular. Such marking technologies use thermochromic ink based labels. Thermochromic ink based labels work by permanently changing state according to the amount of energy deposited over a given area. The technology provides an analog or grayscale printing capability where pixels are developed after exposure to some minimum threshold amount of energy deposited per unit area. Complex systems are required for directing near sufficient energy onto a moving media.

In prior art embodiments, fixed speed media paths are required, or assumed, in order to ensure the correct amount of energy is deposited in the correct portion of the label for the thermochromic ink to be developed. However, fixed speeds are rarely practical and, in some cases, not possible in real world applications. Prior art methods and systems are not equipped to image media on a process line at speeds ranging from a standstill up to 2 meters per second, or faster. Retrofitting existing process lines to operate at a fixed speed is expensive, and in some cases, impossible.

For processing lines with variable speeds, prior art marking techniques that assume fixed media speed provide poor quality imaging. In addition, small variations in an otherwise constant media speed, caused by process line errors or other such events, can result in missed markings or failure to mark the desired area at all. Poor quality markings and missed markings are expensive to detect and correct, and can result in significant cost.

Accordingly, a need exists for print systems equipped to track media speed and adjust the energy levels of the marking engine to provide a consistent uniform energy at the media surface.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for printing.

It is another aspect of the disclosed embodiments to provide a method and system for thermochromic printing.

It is yet another aspect of the disclosed embodiments to provide an enhanced method and system for controlling the energy incident on media in a thermochromic printing system according to media speed.

The aforementioned aspects and other objectives and advantages can now be achieved as described herein. A printing system, method, and apparatus comprises a transport system configured to move a print target, a laser for directing energy on the print target, and a control system configured to adjust the energy directed on the print target according to a present speed of the print target. In an embodiment, the control system further comprises an analog control, a scrolling window control, a pulse width modulation control, and a halftone modulation control. The control system implements the analog control when the present speed of the target is in an analog control speed range, the control system implements the scrolling window control when the present speed of the target is in a scrolling window control speed range, the control system implements the pulse width control when the present speed of the target is in a pulse width control speed window, and the control system implements the halftone modulation control when the present speed of the target is in a halftone modulation control speed window.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 14 depicts a flow chart illustrating logical operational steps for controlling energy in an analog control mode in accordance with the disclosed embodiments;

FIG. 15 depicts a flow chart illustrating logical operational steps for controlling energy in a scrolling window control mode in accordance with the disclosed embodiments;

DETAILED DESCRIPTION

The particular values and configurations discussed in these non-limiting examples can be varied and are cited merely to illustrate at least one embodiment and are not intended to limit the scope thereof.

Figure 1:
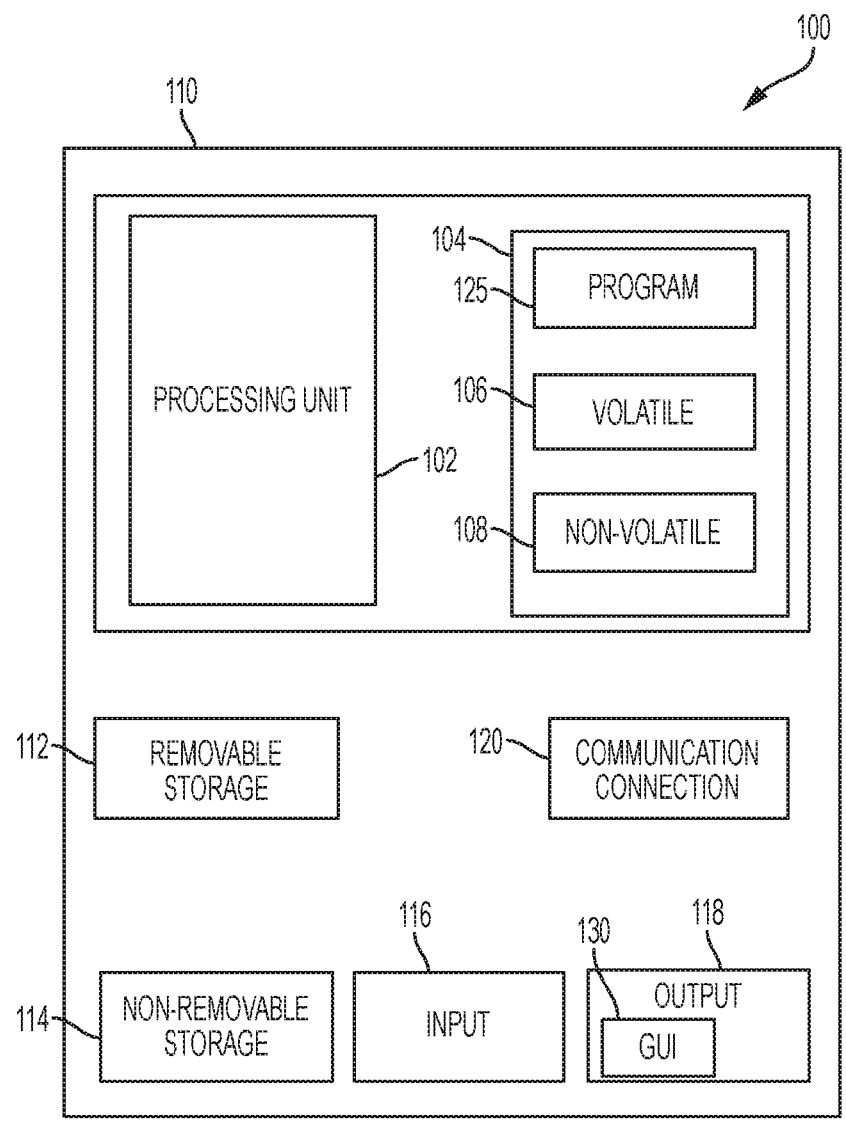
FIG. 1 depicts a block diagram of a computer system which is implemented n accordance with the disclosed embodiments.
Figure 2:
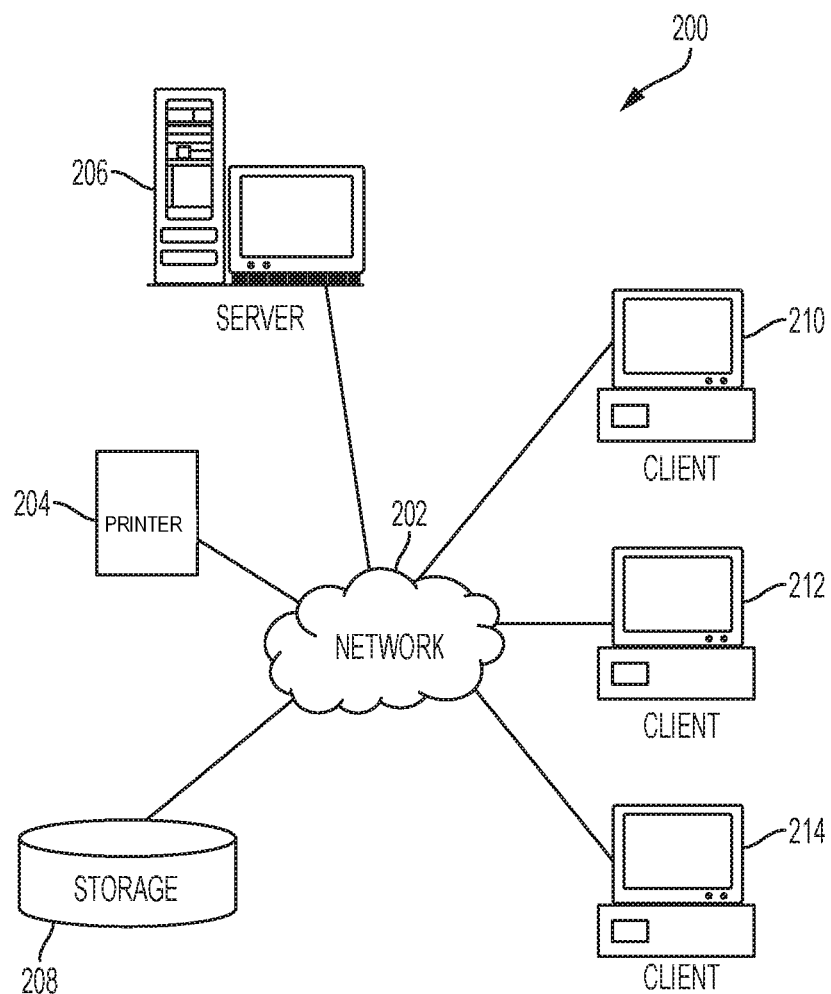
FIG. 2 depicts a graphical representation of a network of data-processing devices in which aspects of the present invention may be implemented.
Figure 3:
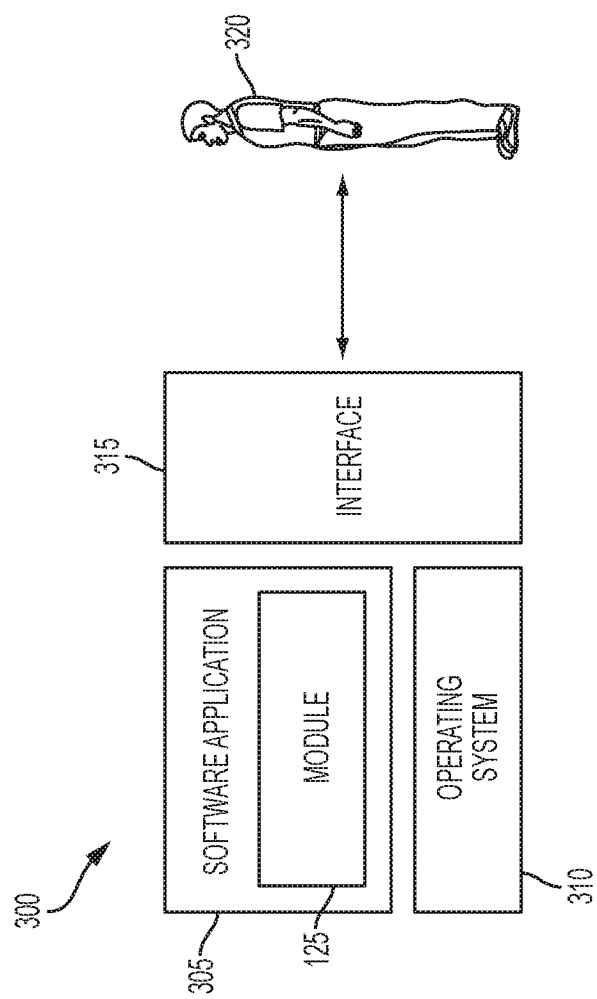
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, accelerometer, gyroscope, medical sensing device, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as printer 204, and a memory storage unit such as, for example, memory or database 208.

In the depicted example, printer 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, sensor, accelerometer, gyroscope, medical sensor, etc.

Computer system 100 can also be implemented as a server such as server 206, depending upon design considerations. In the depicted example, server 206 provides data such as boot files, operating system images, applications, and application updates to clients 210, 212, and 214, and/or to printer 204. Clients 210, 212, and 214 and printer 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

One embodiment comprises a new marking technology based on thermochromic inks. The embodiment uses thermochromic ink based labels which permanently change state depending on the amount of energy deposited over a given area. The marking subsystem can use a combination of high power Laser Diode Arrays (LDAs) in conjunction with Digital Light Projection (DLP) mirror arrays to direct near infrared energy onto a moving media.

The embodiments disclosed herein are configured to image media from a standstill up to 2 meters per second, or faster in some cases. In the simplest terms, the marking subsystem can track the media speed and adjust the energy levels incident on the media to provide a consistent uniform energy at the media surface.

One potential complexity arises because an LDA may not output sufficient energy in a "line time". A "line time" is analogous to a scanline in traditional ROS based laser printers. As such embodiments disclosed herein use a scrolling window to repeat the data for a given area as it moves across the marking window. The combination of subsystem constraints requires a multi-mode imaging system that can track media speeds and adjust laser energy from standstill up through a range of media speeds.

Figure 4:
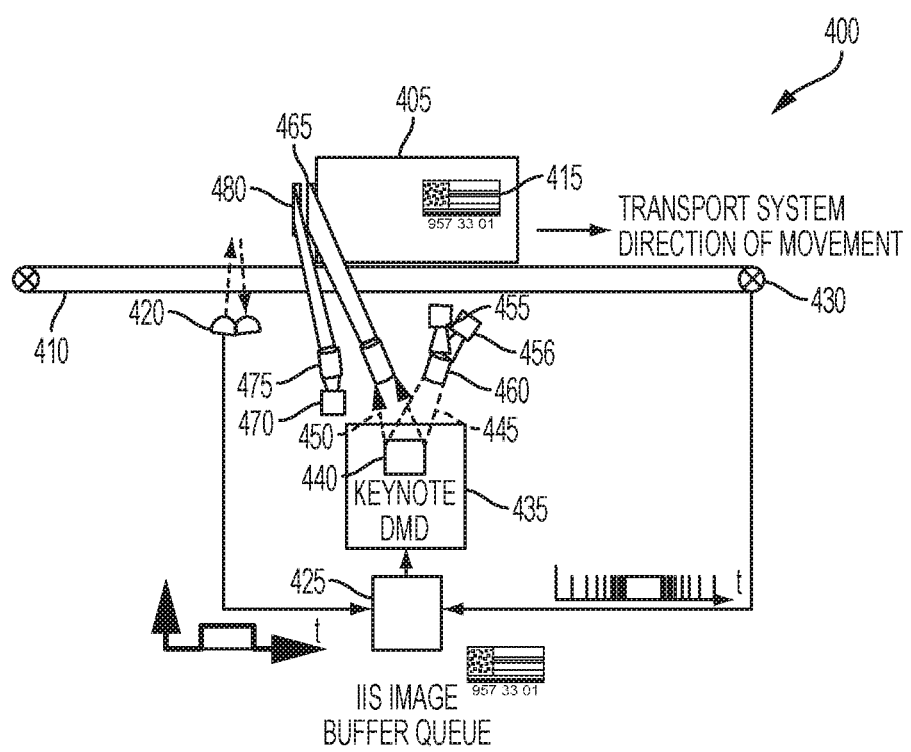
FIG. 4 depicts a block diagram of a printing system in accordance with the disclosed embodiments.

FIG. 4 illustrates a high-level block diagram of the major components in a printing system 400 in accordance with one embodiment. The media 405 (a package in this exemplary embodiment) is transported via a transport system 410, such as a conveyor belt. Other such mechanisms for transporting media may also be used. In other embodiments, the system may not include a transport system 410 at all. In such an embodiment, the media would not move.

The media 405 includes a blank thermochromic ink label 415 attached to its exterior surface. As the media 405 moves along the conveyor belt 410, it trips the product lead edge sensor 420 which informs the image input system 425 that a target, such as label 415 is in position for marking.

An encoder 430, attached to the transport system 410, provides one pulse or tick for every line of movement. A line corresponds to one pixel width line of marking. In this example, a line is defined as 1/274 of an inch. In other embodiments, a line may be defined as any size, according to design requirements. The image input system 425 transmits a line of data to the digital micro mirror device (DMD) board 435. The DMD board 435 in turn processes the line of data and loads it into the DLP mirror array buffer.

At the next encoder tick, the DMD hardware provides a DLP load signal which causes the data previously loaded in the DLP mirror array buffer to drive the DLP mirrors 440 to a required position. This processing time is known as the mirror settling time and is generally on the order of 12 microseconds. The DLP mirrors 440 direct the LDA light 445 to either a beam dump area (not shown), absorptive material in the optics path, or to the optics path 450 and eventually onto the media 405.

The thermochromic ink label 415 material can use a "write black" system, meaning energy must be directed onto the label in order to create a visible pixel. Most commonly, the energy directed onto the thermochromic ink label 415 is laser energy, but other forms of energy may alternatively be used.

In an embodiment, two LDAs, LDA 455 and LDA 456 are used to generate sufficient energy at the media 405. In other embodiments, different numbers of LDAs may also be used depending on design considerations. A number of lenses and mirrors in addition to the DLP mirrors 440 may be required to adequately provide energy to the thermochromic ink. However, all such optical elements contribute to energy losses.

The optical beam path 460 takes the laser beam from each of the LDAs, including LDA 455 and LDA 456, and creates a uniform 2D rectangular shaped "beam". The beam is reflected off the DLP mirror array 440 to create a 2D pixel map. The optics system ensures that image data is focused at the correct point in the marking zone 465. The marking zone 465 represents the area where the beam is incident on the thermochromic ink label 415. In the exemplary situation illustrated in FIG. 4, the thermochromic ink label 415 has passed the marking zone 465.

A preheat subsystem, consisting of an LDA 470 and optics 475, directs energy to the media in an area adjacent to, and just preceding, the marking zone 465 called the preheat zone 480. The preheat function brings the thermochromic ink label 415 to a temperature point just below the point at which the thermochromic ink label 415 will begin to expose and reveal visible marking.

The process of transmitting image data, one line per encoder 430 tick/pulse, to the DLP mirrors 440 repeats as the package moves on the transport system 410. The imaging input system 425 has internal timing logic to control when the image data or blanking data is passed to the marking zone 465. As the trail edge of the media 405 passes by the sensor 420, a signal is generated informing the imaging input system 425 that printing is complete. The imaging input system 425 can then output blank data until the next media arrives at the sensor 420.

Figure 5:
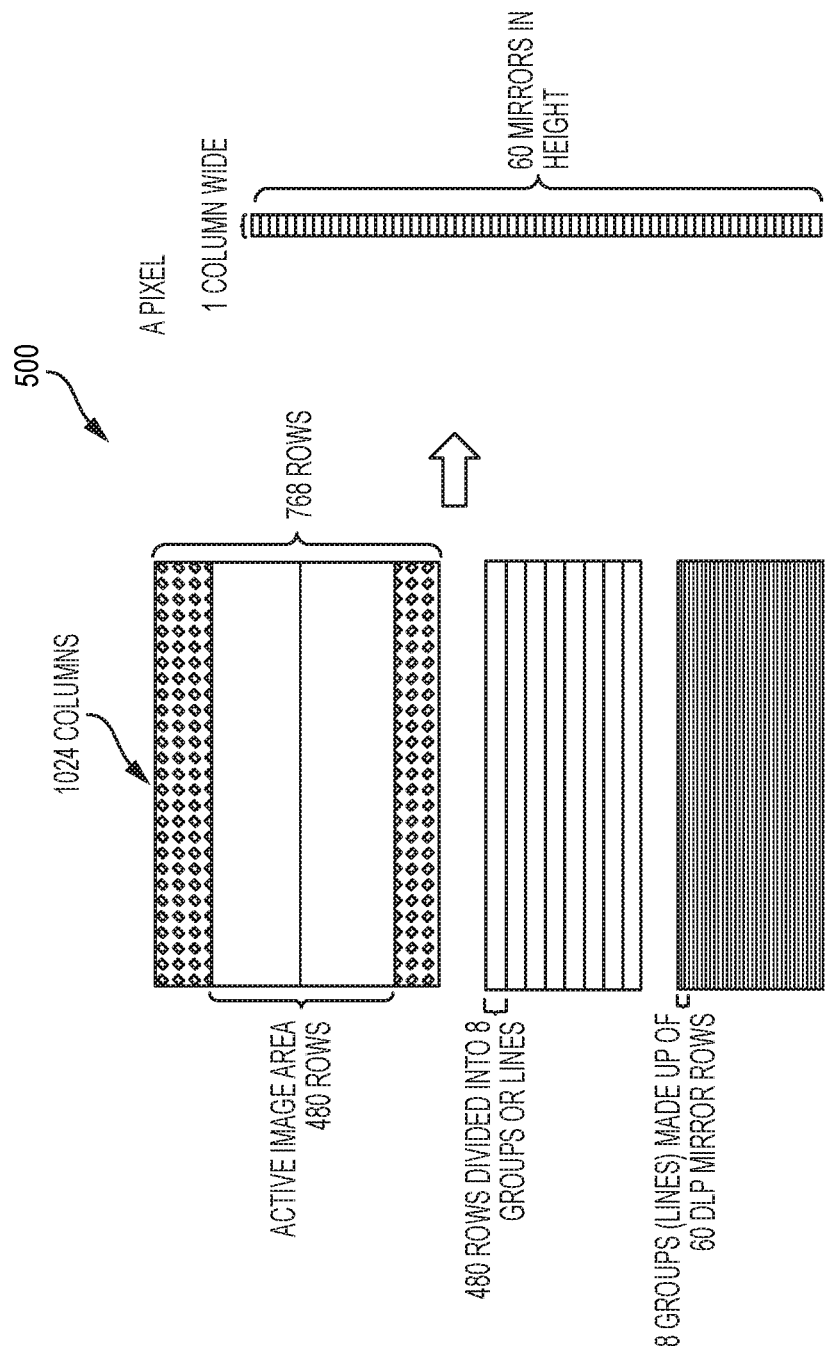
FIG. 5 depicts a block diagram of a DLP mirror mapping in accordance with the disclosed embodiments.

FIG. 5 illustrates a DLP mirror mapping 500 in an exemplary embodiment of the systems and methods disclosed herein. It should be understood that the number of mirrors and associated sizes are exemplary and provided for illustrative purposes only. Other numbers and sizes may alternatively be used without departing from the scope of this disclosure.

In the present embodiments, laser energy is directed by the DLP mirror array to one of two locations, a beam dump area or a precise 2D point in the marking zone. In an exemplary embodiment, the DLP can consist of a matrix of 1024 columns of mirrors and 768 mirror rows as illustrated in FIG. 5. The printer system uses a subset of the total number of mirrors—1024×480. This corresponds to 491,000 mirrors.

The optical system takes the 1024 columns and translates them to 1/960 inch per mirror in the cross-process or X dimension. Similarly, in the process or V dimension 60 mirror rows are grouped and correspond to 1/274 of an inch. FIG. 5 shows the DLP, active image area (where the 2D beam impinges the DLP), the 8 groups or lines, and the 60 mirror rows that make up each line.

Given this mapping, the amount of energy that can be directed to a spot or pixel on the media in a line time is insufficient to cause the label material to fully develop an Optical Density (OD) of 1 or more. Thus, in order to direct more energy on a pixel, a line of image data can be repeated N line times. The media moves a line width every encoder tick. Thus, the image data can be moved by the same amount to "reimage" or "reflash" a line. This process can be repeated N times to increase the energy deposited on a pixel and hence increase the OD. In an exemplary embodiment, 8 line times are required to create a pixel with an OD greater than one. Thus, each line of data is shifted 60 mirror rows every encoder tick.

Figure 6:
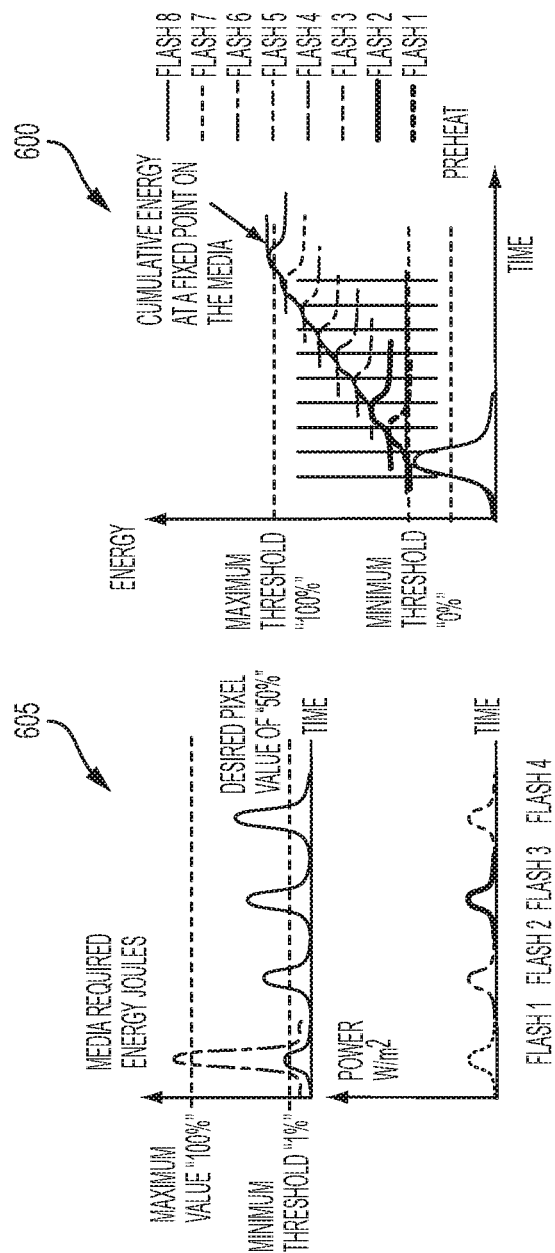
FIG. 6 depicts a chart illustrating an increase in energy by flashing media in accordance with disclosed embodiments.

FIG. 6 illustrates the general concept of increasing the energy deposited on a pixel through a scrolling window that flashes the same line of data multiple times in plot 605. The plot 600 shows a fixed point on the media flashed 8 times. The plot 600 illustrates that each flash increases the cumulative energy at the fixed point until the maximum threshold energy is reached. The concept of preheating is also illustrated in plot 600. As shown, preheating can also be incorporated before the media is flashed so that the media is heated to just below the minimal threshold energy required for visible optical density.

It should be appreciated that when the encoder pulse frequency varies, the transport speed of the media is fluctuating. The fluctuating speed of the media can result in significant over or under exposure of the thermochromic ink. For example, if the media speed slows during the exposure window, the corresponding line time goes up, which could result in a significant overexposure of the thermochromic ink. Similarly, if the media speed increases the line time decreases and the thermochromic irk may be dramatically underexposed. Thus, it is a critical aspect of the embodiments disclosed herein that the marking system 400 track and adjust the intensity of the LDA to ensure operation from a standstill up to the maximum defined speed.

In an embodiment, a multi-mode energy control method can be used to allow the media in a thermochromic printing system to vary from a standstill to a predetermined maximum speed. The energy control method ensures that the print system provides the desired amount of energy on the media regardless of speed or speed changes, and that the print system does not generate image artifacts due to media speed changes. The embodiments employ a multi-mode energy control system and method with four operating regions, an analog control region, a scrolling window control region, a pulse width modulation control region, and a halftoning control region.

Figure 7:
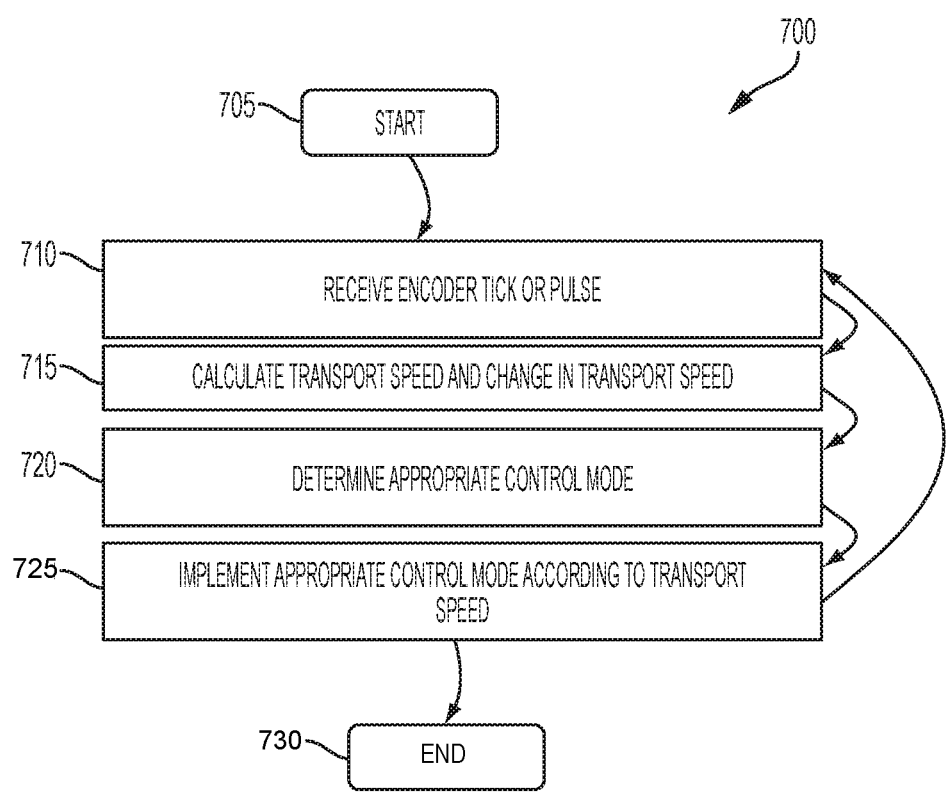
FIG. 7 depicts a flow chart illustrating logical operational steps for controlling energy incident on media in accordance with the disclosed embodiments.

In an example embodiment, the image input system 425 implements the primary control loop associated with the energy control method disclosed herein. FIG. 7 illustrates a flow chart of operations depicting a method 700 of logical operational steps associated with the primary control loop implemented by the image input system 425. The control loop starts as shown at block 705. As indicated at block 710, the image input system 425 receives the encoder input tick or pulse. The image input system 425 then calculates the transport system speed as well as the rate of change in the transport system speed, as shown at block 715. The image input system 425 then determines what control region and associated control mode is appropriate according to the current speed, as shown at block 720. The image input system 425 then implements the control mode by adjusting the various actuators based on the required operating mode, as shown at block 725. The process then recycles. The control loop ends as indicated at block 730 when printing is complete.

Thus, as illustrated in flow chart 700, the image input system 425 continuously monitors the transport encoder speed. A dynamic tracking module can track the encoder period (1/speed) using a sliding window. The sliding window has an upper period and lower period register along with a window increment. The image input system 425 control loop is used to monitor this period and take appropriate action to adjust control mode.

Figure 8:
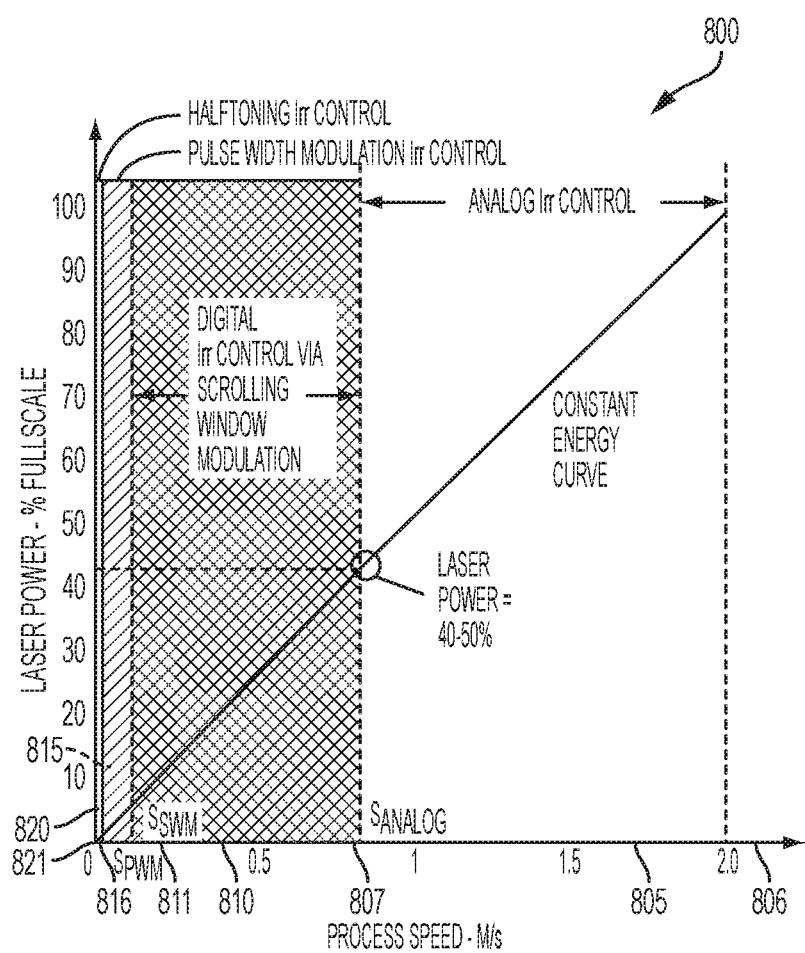
FIG. 8 depicts a chart illustrating control regions as a function of process transport speed in accordance with the disclosed embodiments.

FIG. 8 illustrates a plot 800 of transport process speed versus laser power. The plot illustrates an exemplary case where the goal is to maintain a constant energy of 110 mW/mm2, independent of the transport system speed. It should be appreciated that 110 mW/mm2 is an example energy level. Actual values will vary based on media characteristics, optical losses, LDA operating regions, etc.

Plot 800 illustrates the control modes used at various process speeds to maintain constant energy incident on the media. For example, if the transport speed $S_i$ of sample i is in the range of $S_{Analog}$ 807$\leq S_i \leq S_{Max}$ 806, the system is in Analog control region 805. If the transport speed $S_i$ is in the range of $S_{Swm}$ 811$\leq S_i \leq S_{Analog}$ 807, the system is in the scrolling window control region 810. If the transport speed $S_i$ is in the range of $S_{Pwm}$ 816$\leq S_i \leq S_{Swm}$ 811, the system is in the pulse width modulation control region 815. And if the transport speed $S_i$ is in the range of Zero 821$\leq S_i \leq S_{Pwm}$ 816, the system is in the Halftoning control region 820. Note $S_{Analog}$ 807, $S_{Max}$ 806, $S_{Swm}$ 811, and $S_{Pwm}$ 816 can be empirically measured and stored in the image input system 425 and provided as inputs to the multi-mode energy control loop.

Figure 9:
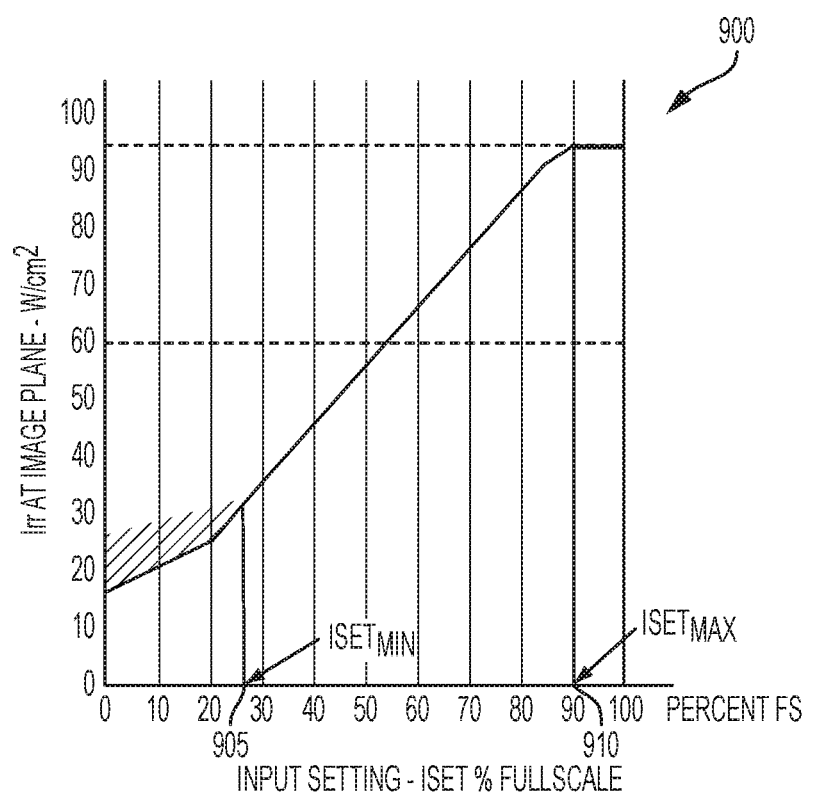
FIG. 9 depicts a chart illustrating power as a function of current in accordance with the disclosed embodiments.

For certain, generally higher process speeds where $S_{Analog}$ 807$\leq S_i \leq S_{Max}$ 806, an analog control mode is employed. Laser diode arrays have a range in which their output power level is a linear function of their input current. Below a certain value, typically 30-40% of full power, the power across the LDAs becomes non-uniform. This can lead to image artifacts depending on the level of non-uniformity. FIG. 9 illustrates a plot 900 that shows the input current as a percentage of full scale and the corresponding Irradiance output. The analog control mode is thus selected when the incident irradiance stays in the linear region of the Irr curve. The LDA analog current is given as ISET. This region is defined at the beginning as $ISET_{min}$ 905 and ends at $ISET_{max}$ 910. In the analog control region 805, the image input system 425 controls LDA power by varying ISET within the linear range. In the exemplary plot 900, the ISET varies between 25% and 90% of full-scale. The control loop remains in the analog control mode until process speed dips below $S_{Analog}$ 807. At this point the control loop moves t the scrolling window control mode.

Figure 10:
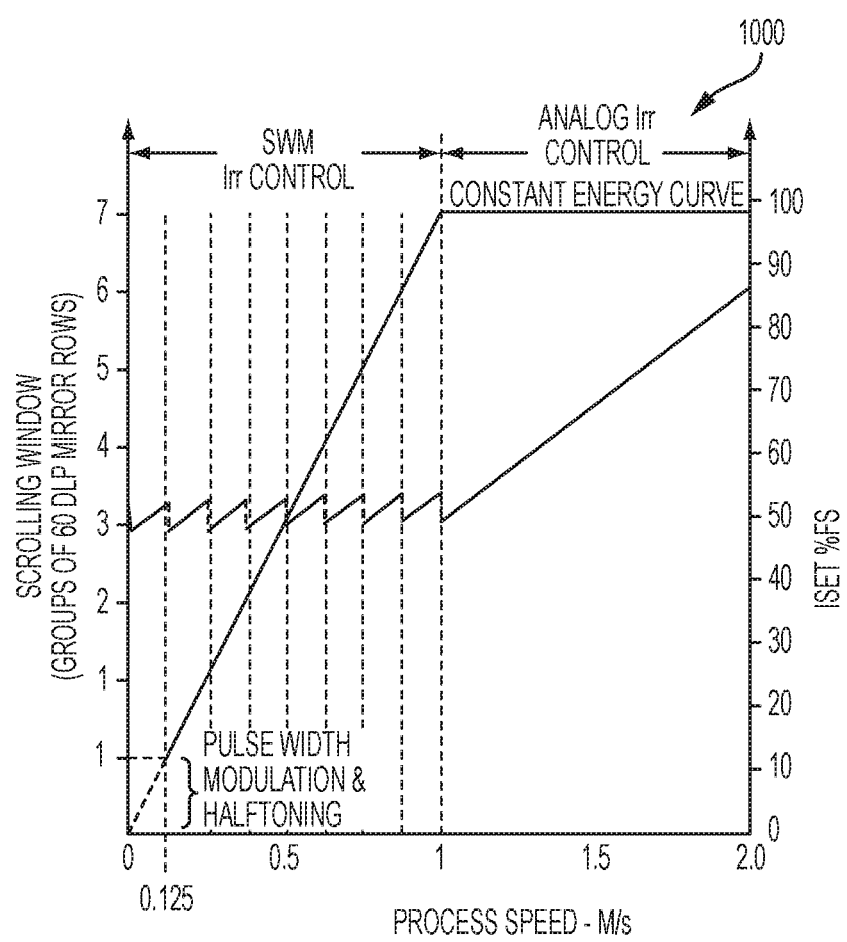
FIG. 10 depicts a chart illustrating groups of DLP mirror rows as function of process speed in accordance with the disclosed embodiments.

In the scrolling window control region 810 of $S_{Swm}$ 811$<S_i \leq S_{Analog}$ 807, analog control remains but is supplemented by reducing the scrolling window width. Reducing the scrolling window width reduces power in order to stay on the constant energy curve. The scrolling window control region 810 is a hybrid mode that both adjusts ISET in a narrow range and modulates the scroll window size. The ISET value, shown in plot 1000 in FIG. 10, is increased to the point where irradiance corresponding to ISET with 7 scrolling lines and is equal to the irradiance corresponding to $ISET_{min}$ with 8 scrolling lines. At this point the scrolling window is reduced from 8 to 7.

As the transport system speed decreases or continues to decelerate, the Analog irradiance control continues until $ISET=ISET_{min}$. At this point the scrolling window size is reduced again 7−1=6. ISET is increased back to an irradiance corresponding to ISET with 7 scrolling lines. This process continues as transport system speed decreases until the scrolling window size is one and $ISET_{min}$ is reached. The transport speed is now equal to $S_{Pwm}$ 811 and scrolling window mode is no longer capable of reducing the irradiance. Thus, ISET remains at $ISET_{min}$ and the multi-mode energy control loop moves to the pulse width modulation region 815.

Figure 11:
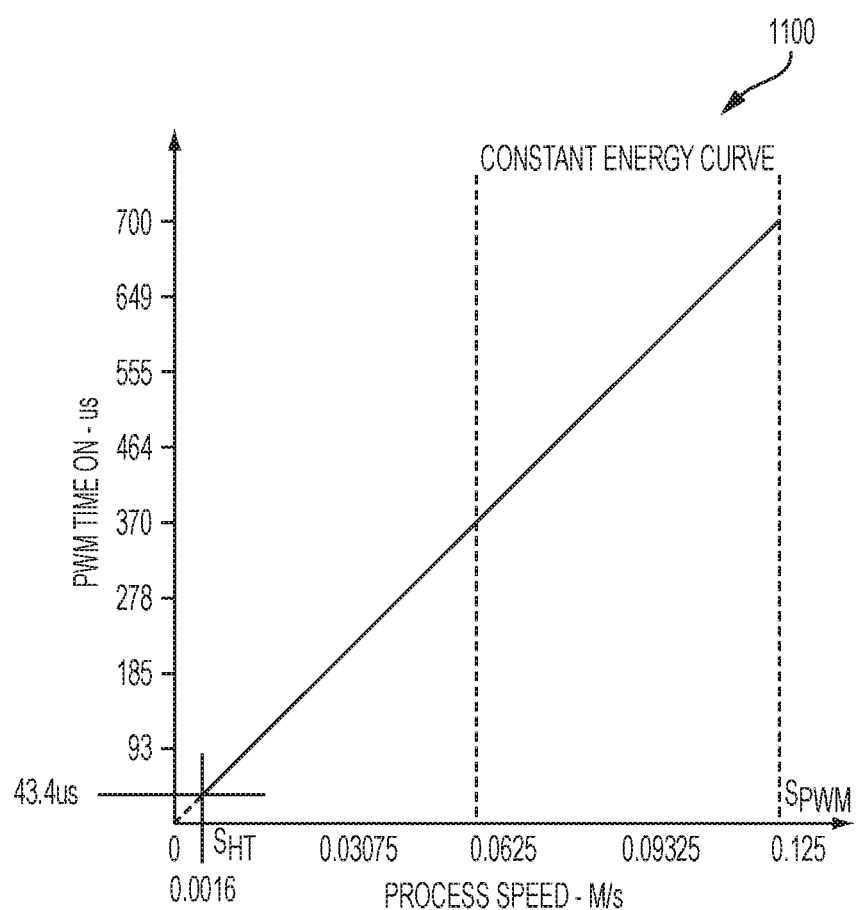
FIG. 11 depicts a chart illustrating on time as a function of process speed in accordance with the disclosed embodiments.

In the pulse width modulation region 815, the transport system speed, $S_i$, is in the range of $S_{Pwm}$ 811$\leq S_i < S_{Swm}$ 816. In pulse width modulation region 815, the scrolling window is set to 1 and the LDA analog current, ISET, is set to $ISET_{min}$. FIG. 11 includes a plot 1100 of process speed and pulse width modulation "Time On."

In the pulse width modulation region the multi-mode energy control loop actuator is the time duration of an image. In the pulse width modulation region, the pixel "on time" is modulated as a function of process speed. For example, the pixel on time can be shortened to effectively reduce the energy incident on the media. Even with such modulation of the pixel on time, eventually a limit is reached. This limit is defined as the minimum time that DLP can be on. Experimentally, this limit has been observed to be on the order to 10 µseconds, but the limit may vary depending on design constraints. Note the total cycle time is 44 µseconds.

The final limiting parameter in the pulse width modulation region is the amount of time required to load DLP array groups. In an exemplary embodiment, this includes loading 2 DLP array groups and 96 DLP mirror rows of which 60 are active. In such a scenario, approximately 10 µseconds are required to load 2 groups (i.e., load pixels). Approximately 12 µseconds are required for the mirrors to settle to the desired state. Approximately 10 µseconds are needed to load a group (i.e., load the off state to both groups). Note that the DLP stays in the previous state while the new off state is loaded. Approximately 12 µseconds are required for all the mirrors to settle to the off state. This equates to approximately 44 µseconds of total cycle time with an active time of approximately 10 µseconds. It is once again important to note that this scenario is exemplary and the timing may differ depending on design constrains and choices.

Figure 12:
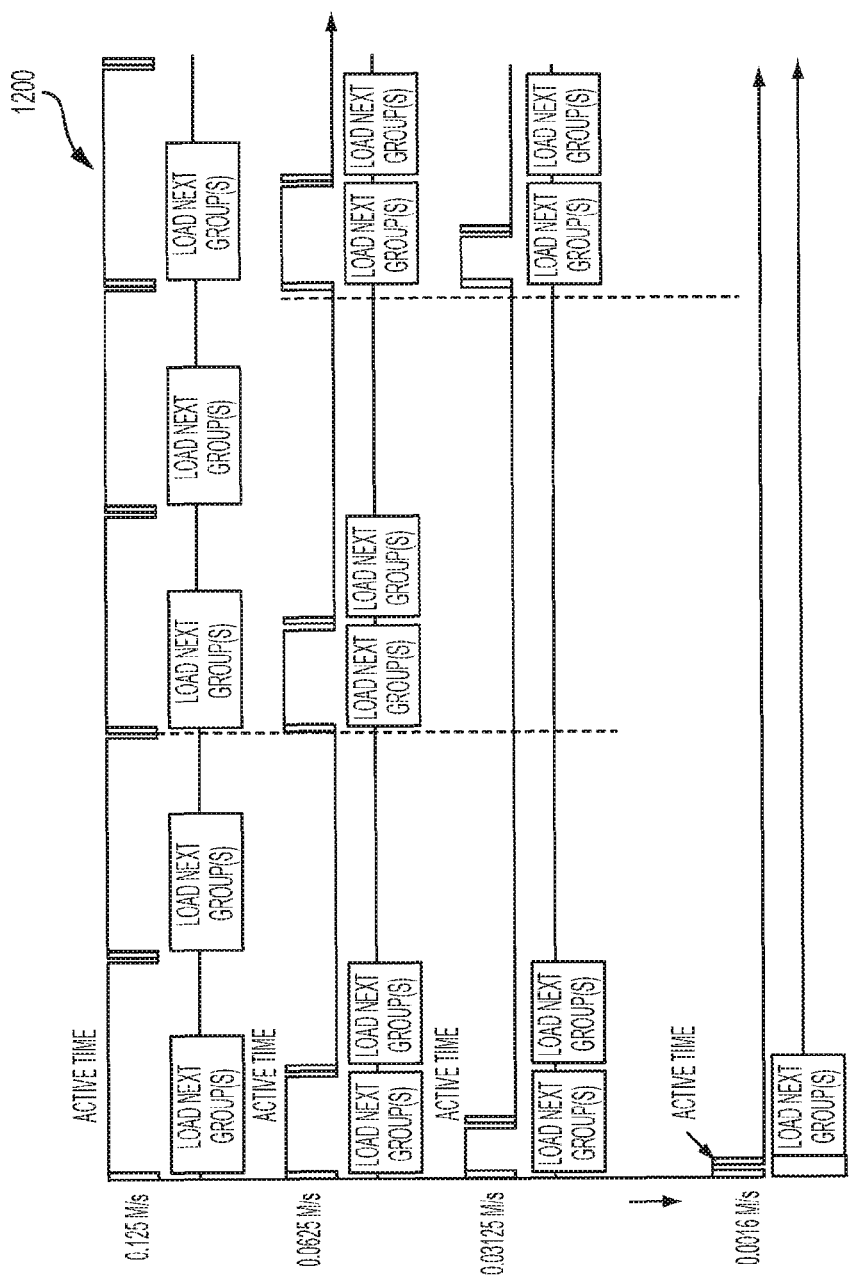
FIG. 12 depicts a chart illustrating process timing associated with mirror on time in accordance with the disclosed embodiments.

FIG. 12 illustrates a chart 1200 that shows how the on time varies as a function of a few exemplary transport speed values. Process speeds in the pulse width modulation region require the image input system 425 to send both a line of image data and, after a variable amount of time, send a blank line of image data. In other embodiments, the DMD may also provide a self-timed mode where the image line includes metadata defining the amount of time to leave the data on.

The halftone region 820 is entered when the transport system speed, $S_i$, is in the range of zero $821 \leq S_i < S_{Pwm}$ 816. At the point where $S_i = S_{Pwm}$, the scrolling window is set to 1, the LDA current is set to $ISET_{min}$, and the DLP on time is set to a minimum (for example, approximately 10 μseconds in the above example). To further reduce the irradiance at the media, the multi-mode energy control loop can reduce energy incident on the media by systematically turning off a subset of the DLP mirrors until only one mirror remains on.

Figure 13:
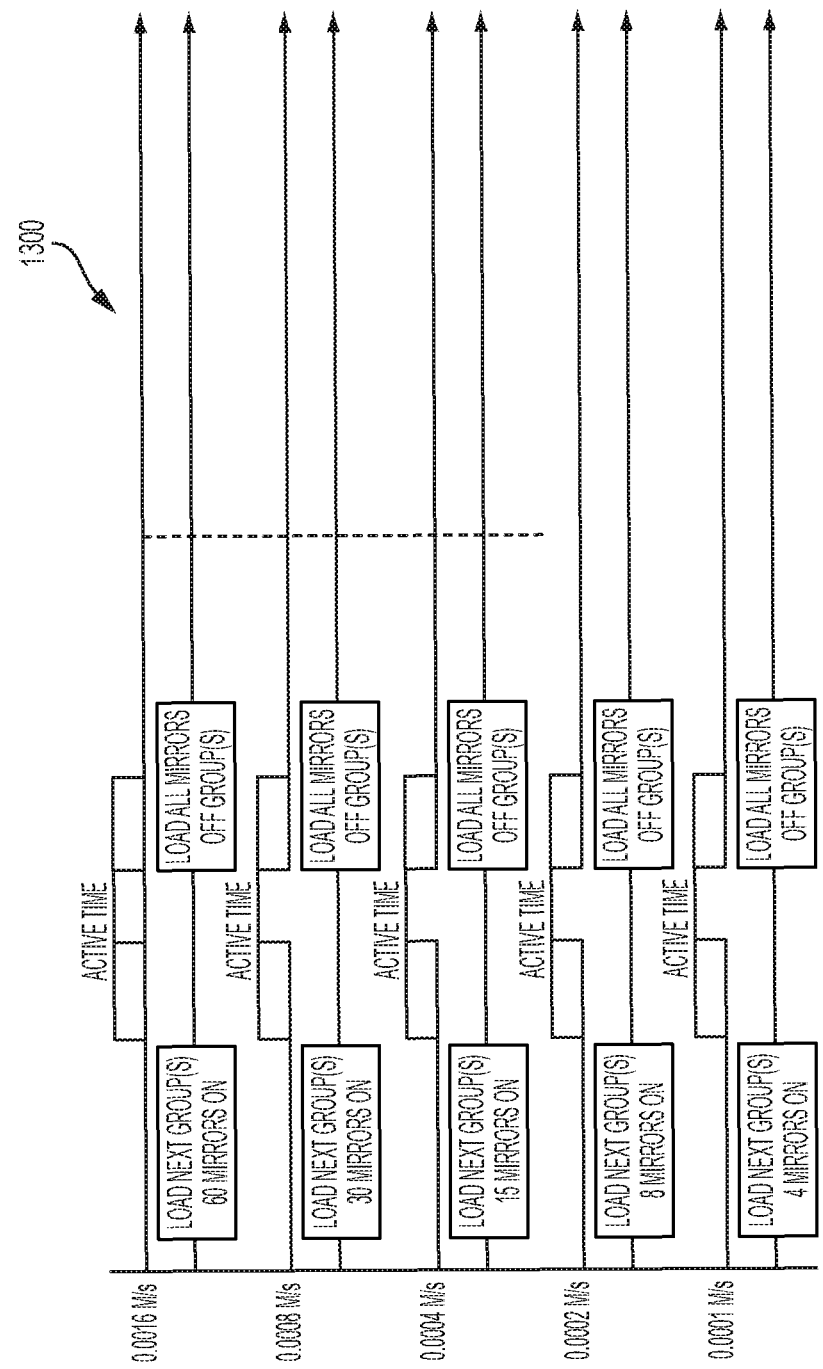
FIG. 13 depicts a chart illustrating process timing associated with active mirrors in accordance with the disclosed embodiments.

Continuing with the exemplary embodiment with transport speeds $< S_{Pwm}$ 816, the 60 mirrors that represent 1/960" are modulated to reduce irradiance. At these slow speeds, grayscale printing will revert to binary printing as the system reduces energy levels by turning off mirrors. FIG. 13 provides a chart 1300 which shows the exemplary case where the transport speed is 0.0016 M/s and all 60 mirrors are on. As the speed is further reduced by a factor of two, the number of mirrors turned on drops to 30. At 0.00001 M/s, the system will reach its limit with only 1 mirror being on.

FIGS. 14-17 illustrate the control procedure for each of the analog control mode, scrolling window control mode, pulse width modulation control mode, and halftone modulation control mode ire accordance with the disclosed embodiments.

FIG. 14 illustrates the control procedure 1400 associated with an analog control mode. At step 1405, the encoder input is provided to the image input system 425. The image input system 425 implements the control loop method 700, and upon determining the process speed is within the speed range for the application of the analog control sets the ISET at the necessary value between, for example, 25% and 90% of full strength at step 1410. A constant current source is provided to one or more LDAs at step 1415 which produce one or more laser beams. The optical beam path combines beams at step 1420 and focuses them on the DLP. The resulting beams from the DLP are directed via the optical beam path to the media at step 1425. Note that as described above, the beams may be directed onto the media in flashes so that the total energy on the media is sufficient to make the desired portions of the thermochromic ink visible.

FIG. 15 illustrates the control procedure 1500 associated with a scrolling window control mode. At step 1505, the encoder input is provided to the image input system 425. The image input system 425 implements the control loop method 700, and upon determining the process speed is within the speed range for the Application of the scrolling window control mode sets the ISET at the necessary value between, for example 25% and 32% of full strength at step 1510. A constant current source is provided to one or more LDAs which produce one or more laser beams at step 1515. The optical beam path combines beams at step 1520 and focuses them on the DLP. In the scrolling window control mode, the ISET is still adjusted as in the analog control mode, but the scroll window size is also modulated to reduce the incident energy on the media. The resulting beams from the DLP are directed via the optical beam path to the media at step 1525.

Figure 16:
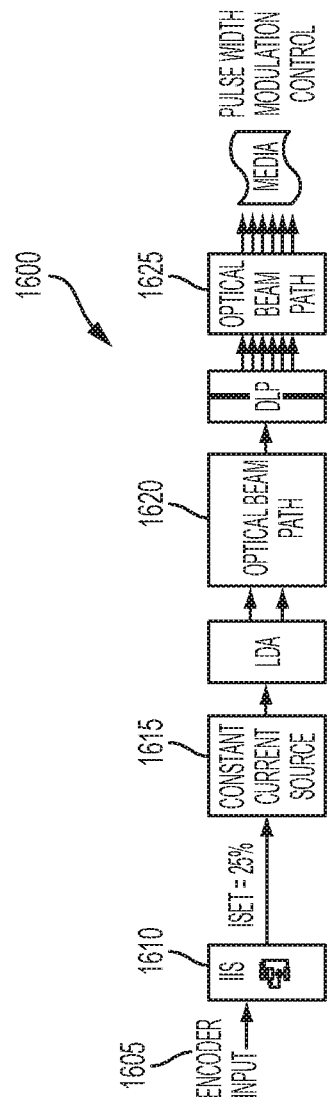
FIG. 16 depicts a flow chart illustrating logical operational steps for controlling energy in a pulse width modulation control mode in accordance with the disclosed embodiments.

FIG. 16 illustrates the control procedure 1600 associated with a pulse width modulation control mode. At step 1605, the encoder input is provided to the image input system 425. The image input system 425 implements the control loop method 700, and upon determining the process speed is within the speed range for the Application of the pulse width modulation control mode sets the ISET at the necessary value of, for example, 25% at step 1610. A constant current source is provided to one or more LDAs which produce one or more laser beams at step 1615. The optical beam path combines beams at step 1620 and focuses them on the DLP. In the pulse width modulation control mode, the ISET is constant and the scroll window size has been reduced to its minimum value. In addition, the incident energy is further reduced by modulating the pixel on time as a function of process speed. The resulting beams from the DLP are directed via the optical beam path to the media at step 1625.

Figure 17:
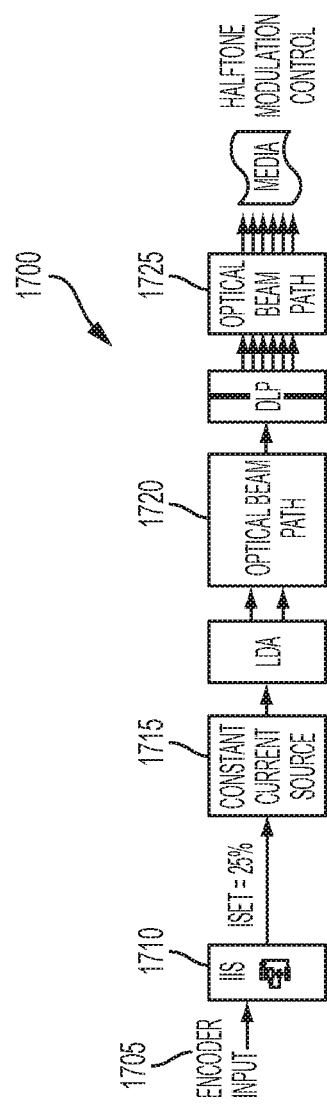
FIG. 17 depicts a flow chart illustrating logical operational steps for controlling energy in a halftoning control mode in accordance with the disclosed embodiments.

FIG. 17 illustrates the control procedure 1700 associated with a halftone modulation control mode. At step 1705, the encoder input is provided to the image input system 425. The image input system 425 implements the control loop method 700, and upon determining the process speed is within the speed range for the Application of the halftone control mode sets the ISET at the necessary value of, for example, 25% at step 1710. A constant current source is provided to one or more LDAs at step 1715 which produce one or more laser beams. The optical beam path combines beams at step 1720 and focuses them on the DLP. In the halftone control mode, the ISET is constant, the scroll window size has been reduced to its minimum value, and the on time of the beams is at a minimum. In addition, DLP is further reduced by turning off mirrors in the DLP as a function of transport speed. The resulting beams from the mirrors in the DLP that are left on are directed via the optical beam path to the media at step 1725.

At some speed, $S_{NL}$, that can be empirically determined, the response of the label material and resulting OD will become non-linear. The multi-mode energy control loop can compensate for such non-linearities by adjusting any of the available actuators in the operating zone.

In certain, embodiments, preheating can be accomplished by directing a separate beam of laser light to the region just before the marking zone in the preheating zone as shown in FIG. 4. The preheat beam may have digital energy control (i.e., no DLP is in the beam path) or may have only analog control. The preheat function is used to bring the media up to a temperature just below the minimum OD that is visible. This reduces the LDA energy required to image a pixel via the DLP.

At very slow speeds the energy levels from the preheat step may exceed the limit of invisibility, and create a gray or black background image on the media. The multi-mode energy control loop can use the transport system speed to determine if and when the preheat is necessary. At transport system speeds where the preheat step is off, the overall image path energy levels may need to be increased to ensure an OD of >1 is achievable. The multi-mode energy control loop can compensate for the higher energy levels by varying which actuators are used for a given speed.

Based on the foregoing, it can be appreciated that a number of embodiments, preferred and alternative, are disclosed herein. For example, in one embodiment, a printing system comprises a transport system configured to move a print target, a laser for directing energy on the print target, and a control system configured to adjust the energy directed on the print target according to a present speed of the print target. In an embodiment, the control system further comprises an analog control, a scrolling window control, a pulse width modulation control, and a halftone modulation control.

In another embodiment, the control system implements the analog control when the present speed of the target is in an analog control speed range, the control system implements the scrolling window control when the present speed of the target is in a scrolling window control speed range, the control system implements the pulse width control when the present speed of the target is in a pulse width control speed window, and the control system implements the halftone modulation control when the present speed of the target is in a halftone modulation control speed window.

In an embodiment, the analog control comprises providing an input current to a laser diode array wherein the input current results in an output power of the laser diode that has a substantially linear relationship to the input current.

In an embodiment, the scrolling window control comprises adjusting the exposure time the energy is directed on the print target by adjusting a target window size associated with the print target wherein the target window size corresponds with the present speed when the present speed is in the scrolling window control speed range.

In an embodiment, the pulse width modulation control comprises adjusting an exposure time the energy is directed onto the print target wherein the exposure time corresponds with the present speed when the present speed is in the pulse width control speed window.

In an embodiment, the halftone modulation control comprises reducing the energy directed on the print target by dumping a portion of the energy directed on the target with a beam dump wherein the portion of the energy directed on the target corresponds with the present speed when the present speed is in the halftone modulation control speed window.

In an embodiment, the print target comprises a substrate and thermochromic ink.

In an embodiment, a printing method comprises moving a print target with a transport system, directing energy on the print target with a laser, and adjusting the energy directed on the print target according to a present speed of the print target with a control system. The control system further comprises an analog control, a scrolling window control, a pulse width modulation control, and a halftone modulation control.

In an embodiment, the method further comprises implementing the analog control when the present speed of the target is in an analog control speed range; implementing the scrolling window control when the present speed of the target is in a scrolling window control speed range; implementing the pulse width control when the present speed of the target is in a pulse width control speed window; and implementing the halftone modulation control when the present speed of the target is in a halftone modulation control speed window.

In an embodiment, the analog control comprises providing an input current to a laser diode array wherein the input current results in an output power of the laser diode that has a substantially linear relationship to the input current.

In an embodiment, the scrolling window control comprises adjusting the exposure time the energy is directed on the print target by adjusting a target window size associated with the print target wherein the target window size corresponds with the present speed when the present speed is in the scrolling window control speed range.

In an embodiment, the pulse width modulation control comprises adjusting an exposure time the energy is directed onto the print target wherein the exposure time corresponds with the present speed when the present speed is in the pulse width control speed window.

In an embodiment, the halftone modulation control comprises reducing the energy directed on the print target by dumping a portion of the energy directed on the target with a beam dump wherein the portion of the energy directed on the target corresponds with the present speed when the present speed is in the halftone modulation control speed window.

In yet another embodiment, a printing apparatus comprises a transport system configured to move a print target; a laser for directing energy on the print target; and a control system configured to adjust the energy directed on the print target according to a present speed of the print target the control system further comprising: implementing an analog control when the present speed of the target is in an analog control speed range, implementing a scrolling window control when the present speed of the target is in a scrolling window control speed range, implementing a pulse width control when the present speed of the target is in a pulse width control speed window, and implementing a halftone modulation control when the present speed of the target is in a halftone modulation control speed window.

In an embodiment, the analog control comprises providing an input current to a laser diode array wherein the input current results in an output power of the laser diode that has a substantially linear relationship to the input current.

In an embodiment, the scrolling window control comprises adjusting the exposure time the energy is directed on the print target by adjusting a target window size associated with the print target wherein the target window size corresponds with the present speed when the present speed is in the scrolling window control speed range.

In an embodiment, the pulse width modulation control comprises adjusting an exposure time the energy is directed onto the print target wherein the exposure time corresponds with the present speed when the present speed is in the pulse width control speed window.

In an embodiment, the halftone modulation control comprises reducing the energy directed on the print target by dumping a portion of the energy directed on the target with a beam dump wherein the portion of the energy directed on the target corresponds with the present speed when the present speed is in the halftone modulation control speed window.

It will be appreciated that variations of the above-disclosed and other features and functions, or alternatives thereof, may be desirably combined into many other different systems or applications. It will also be appreciated that various presently unforseen various presently unforeseen or unanticipated alternatives, modifications, variations or improvements therein may be subsequently made by those skilled in the art, which are also intended to be encompassed by the following claims.

What is claimed is:
1. A printing system comprising:
 a transport system configured to move a print target;
 a laser for directing energy on said print target; and
 a control system configured to adjust said energy directed on said print target according to a present speed of said print target said control system further comprising:
  an analog control implemented when said present speed of said target is in an analog control speed range;
  a scrolling window control implemented when said present speed of said target is in a scrolling window control speed range;
  a pulse width control implemented when said present speed of said target is in a pulse width control speed window; and
  a halftone modulation control implemented when said present speed of said target is in a halftone modulation control speed window.

2. The system of claim 1 wherein said analog control comprises:

providing an input current to a laser diode array wherein said input current results in an output power of said laser diode that has a substantially linear relationship to said input current.

3. The system of claim 1 wherein said scrolling window control comprises:

adjusting the exposure time said energy is directed on said print target by adjusting a target window size associated with said print target wherein said target window size corresponds with said present speed when said present speed is in said scrolling window control speed range.

4. The system of claim 1 wherein said pulse width modulation control comprises:

adjusting an exposure time said energy is directed onto said print target wherein said exposure time corresponds with said present speed when said present speed is in said pulse width control speed window.

5. The system of claim 1 wherein said halftone modulation control comprises:

reducing said energy directed on said print target by dumping a portion of said energy directed on said target with a beam dump wherein said portion of said energy directed on said target corresponds with said present speed when said present speed is in said halftone modulation control speed window.

6. The system of claim 1 wherein said print target comprises a substrate and thermochromic ink.

7. A printing apparatus comprising:

a transport system configured to move a print target;

a laser for directing energy on said print target; and a control system configured to adjust said energy directed on said print target according to a present speed of said print target said control system further comprising:

implementing an analog control when said present speed of said target is in an analog control speed range;

implementing, a scrolling window control when said present speed of said target is in a scrolling window control speed range;

implementing a pulse width control when said present speed of said target is in a pulse width control speed window; and implementing a halftone modulation control when said present peed of said target is in a halftone modulation control speed window.

8. The apparatus of claim 7 wherein said analog control comprises:

providing an input current to a laser diode array wherein said input current results in an output power of said laser diode that has a substantially linear relationship to said input current.

9. The apparatus of claim 7 wherein said scrolling window control comprises:

adjusting the exposure time said energy is directed on said print target by adjusting a target window size associated with said print target wherein said target window size corresponds with said present speed when said present speed is in said scrolling window control speed range.

10. The apparatus of claim 7 wherein said pulse width modulation control comprises:

adjusting an exposure time said energy is directed onto said print target wherein said exposure time corresponds with said present speed when said present speed is in said pulse width control speed window.

11. The apparatus of claim 7 wherein said halftone modulation control comprises:

reducing said energy directed on said print target by dumping a portion of said energy directed on said target with a beam dump wherein said portion of said energy directed on said target corresponds with said present speed when said present speed is in said halftone modulation control speed window.

* * * * *